Nov. 7, 1950     M. I. GLASS ET AL     2,529,151
DUAL IMAGE PHOTOGRAPH
Filed July 20, 1950
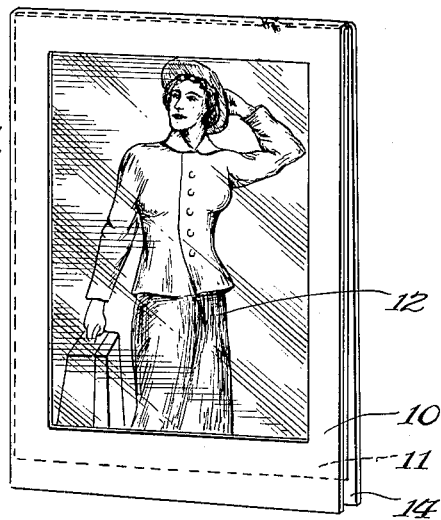
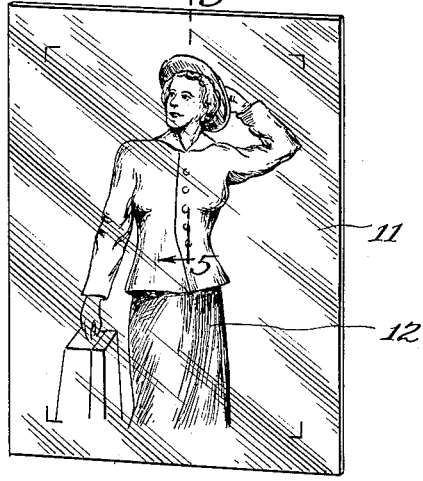
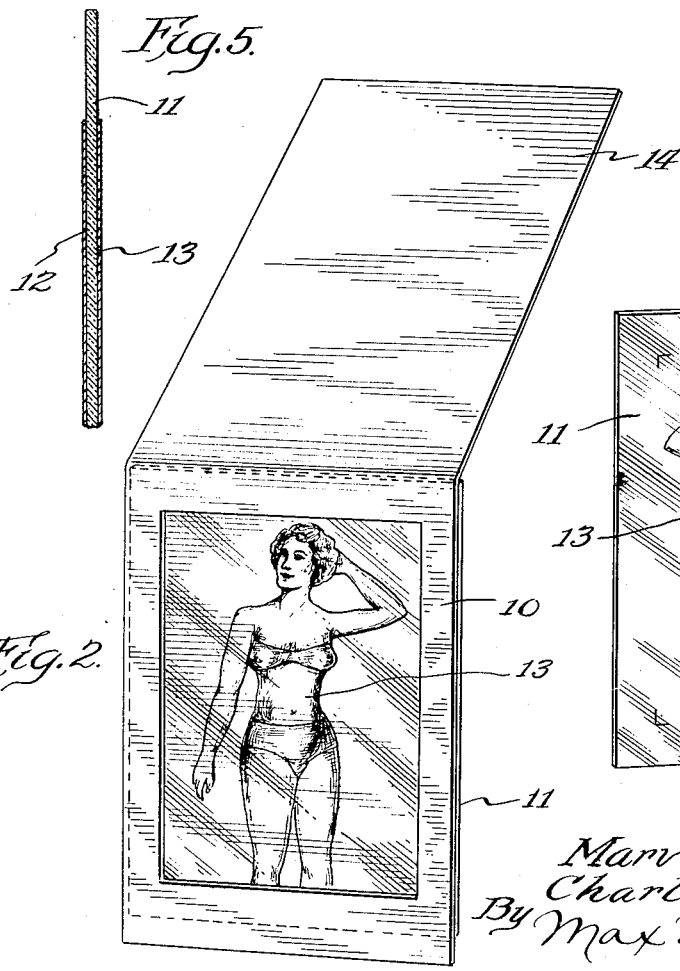
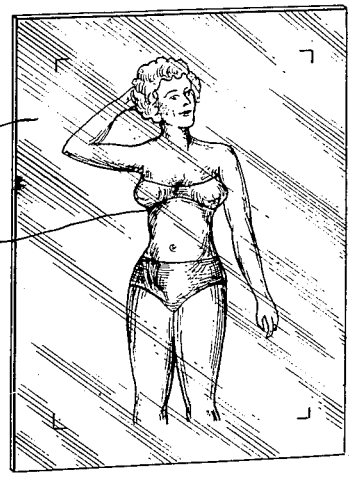
Inventors
Marvin I. Glass and
Charles L. McShane
By Max R. Kraus
Atty.

Patented Nov. 7, 1950

2,529,151

UNITED STATES PATENT OFFICE 2,529,151

DUAL IMAGE PHOTOGRAPH

Marvin I. Glass and Charles L. McShane,
Chicago, Ill.

Application July 20, 1950, Serial No. 174,864

2 Claims. (Cl. 40—137)

Our invention relates to a novelty photograph.

One of the objects of our invention is the provision of a novelty photograph whereby two views dealing with a common subject matter may be displayed as desired so as to show alternate changes in the said views.

A further object of our invention is the provision of a novelty photograph in which two views or images will register exactly in outline and position, except those particular parts or portions which are to show the alternate changes and these being so associated as to give a natural appearance when alternately displayed.

A further object of our invention is the provision of a novelty photograph which when viewed so that light strikes the front thereof displays a figure in fully clothed condition, but which when viewed so that light passes therethrough displays the same figure transformed and in a semi-nude or undraped condition.

According to our invention, a translucent panel is provided on the front surface thereof with an image or view in black tones, and on the rear or opposite surface with an image or view in black tones of greater intensity or in color or combinations of colors, with an opaque flap hingedly attached to the said translucent sheet so as to cover the rear surface. When the view or image is viewed with the opaque flap contiguous to the rear surface only the front image or view is apparent. However, when the flap is raised so that light is permitted to pass from the rear through the translucent panel, the rear image or view is displayed while the front image or view is scarcely apparent.

Other objects and advantages of our invention will become apparent during the course of the following description when considered in connection with the accompanying drawings in which:

Fig. 1 is a perspective view of an embodiment of our invention, in one position of use.

Fig. 2 is a perspective view of the device showing the backing flap in elevated position and in another position of use.

Fig. 3 is a front elevational view of the translucent panel showing an image applied on one surface thereof.

Fig. 4 is a similar view showing the image applied on the opposite surface of the translucent panel, and Fig. 5 is a fragmentary cross-sectional view taken on line 5—5 of Fig. 3 showing the images applied on opposite sides of the translucent panel.

Referring to the drawings, the numeral 10 designates a frame member which may be of cardboard, plastic or the like. Suitably secured to the marginal edges of the frame 10 is a panel 11 of diaphanous material, such as celluloid, plastic or the like. We have found that a product of the Eastman Kodak Co. identified as 6 point matte Coda Pak 1 embodies the desired characteristics. This product is a translucent acetate sheet having a milky white appearance. On the front face of the panel is printed an image 12 or a scene in various tones of black. In the embodiment illustrated, the image 12 is in the form of a female character in fully clothed condition. On the opposite or rearward face of the translucent panel 11 is printed an image 13 of the same figure in color and combinations of color, the said figure, however, being in undraped or semi-nude condition and with corresponding parts of the body in exact registration and size with the image or figure 12 on the opposite surface of the translucent panel 11. For instance, the hair, face, hands and feet must be in exact registration with each other.

The image or figure 13 on the rearward face of the panel may be printed in black tones instead of in colors, the said black tones, however, being of greater intensity than the tones of the image 12 on the front face of the panel 11, thereby to provide a definite contrast between the front and rearward images 12 and 13 respectively.

In the preparation of the translucent panel an object or model in undraped condition is photographed as a color transparency and immediately thereafter an outline of the object or model is traced on the viewing glass of the camera so as to record the exact position of the object or model. The object or model is then draped and positioned so that corresponding parts of the body, in the case of the model, register exactly with the traced outline. The model or object is then photographed to provide a conventional negative. A raised printing plate is then made of each of the photographs and the respective images are printed on opposite faces of the translucent panel so that corresponding parts are in exact registration.

An opaque flap 14 of flexible material is hingedly attached to the frame 10 or to the translucent panel 11 and may be lifted to permit light to pass through the said panel from the rearward side thereof. When the flap 14 is in contiguous relation with the rearward face of the translucent panel 11 only the image 12 on the front face of the translucent panel will be apparent. This figure is, of course, in fully clothed condition. When the flap 14 is raised and the device held in a position such that light from any source may pass through the translucent panel 11, from the rear to the front, the semi-nude or undraped image 13 on the rearward side of the translucent panel becomes apparent, since it is in color and dominates the image 12 printed in black tones. Thus, in one manner of viewing, the device presents a distinctive representation in which the figure is fully clothed and for all purposes resembles a conventional photograph, and in another manner of viewing, a distinctive novel representation is displayed in which the figure is visualized as being in semi-nude or in partly undraped condition.

It is to be understood that variations in construction may be resorted to without departing from the principal of the invention or the scope of the appended claims.

We claim:

1. A photograph mount of such size as to be carried in a person's pocket comprising front and rear members connected together, said front member comprising a translucent panel having imprinted on the front face thereof an image in tones of one color and having imprinted on the back face thereof an image in contrasting colors as related to said first image, said rear member comprising an opaque panel adapted to be selectively positioned contiguous to the back face of said translucent panel, said opaque panel when positioned contiguous to said back face rendering said one color image effective so that it appears as a conventional photograph, said opaque panel when positioned away from said back face so that the same may be viewed in transmitted light rendering said color image effective so that it appears as a conventional color photograph while rendering said single color image ineffective, said front and rear members when spaced from each other form a means for supporting such mount on a horizontal surface.

2. A photographic mount of such size as to be carried in a person's pocket comprising front and rear members connected together, said front member comprising a translucent panel having imprinted on the front face thereof an image in tones of one color and having imprinted on the back face thereof an image in contrasting colors as related to said first image, said rear member comprising an opaque panel formed of cardboard adapted to be selectively positioned contiguous to the back face of said translucent panel, said opaque panel when positioned contiguous to said back face rendering said one color image effective so that it appears as a conventional photograph, said opaque panel when positioned away from said back face so that the same may be viewed in transmitted light rendering said color image effective so that it appears as a conventional color photograph while rendering said single color image ineffective.

MARVIN I. GLASS.
CHARLES L. McSHANE.

REFERENCES CITED

The following references are of record in the file of this patent:

UNITED STATES PATENTS

| Number | Name | Date |
|---|---|---|
| 568,260 | Lawrence | Sept. 22, 1896 |
| 1,268,839 | Hatch | June 11, 1918 |
| 1,881,417 | Hodgkin | Oct. 4, 1932 |